United States Patent
Hsu et al.

(10) Patent No.: US 7,143,240 B2
(45) Date of Patent: Nov. 28, 2006

(54) SYSTEM AND METHOD FOR PROVIDING A COST-ADAPTIVE CACHE

(75) Inventors: Windsor Wee Sun Hsu, Sunnyvale, CA (US); Honesty Cheng Young, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 363 days.

(21) Appl. No.: 10/698,897

(22) Filed: Oct. 31, 2003

(65) Prior Publication Data

US 2005/0097278 A1    May 5, 2005

(51) Int. Cl.
*G06F 12/12* (2006.01)

(52) U.S. Cl. ............. 711/128; 711/113; 711/118; 711/122; 711/144; 711/140; 711/119; 711/133; 711/136

(58) Field of Classification Search ............. None
See application file for complete search history.

(56) References Cited

U.S. PATENT DOCUMENTS

| | | | |
|---|---|---|---|
| 4,463,424 A | | 7/1984 | Mattson et al. |
| 5,394,531 A | * | 2/1995 | Smith ............ 711/136 |
| 5,499,351 A | | 3/1996 | Misaka et al. |
| 5,537,635 A | | 7/1996 | Douglas |
| 5,627,994 A | | 5/1997 | Levy et al. |
| 5,900,011 A | * | 5/1999 | Saulsbury et al. .......... 711/119 |
| 6,052,822 A | | 4/2000 | Kim et al. |
| 6,101,581 A | * | 8/2000 | Doren et al. ............. 711/141 |
| 6,192,458 B1 | | 2/2001 | Arimilli et al. |
| 6,256,747 B1 | | 7/2001 | Inohara et al. |
| 6,418,510 B1 | * | 7/2002 | Lamberts ............. 711/113 |
| 6,493,800 B1 | | 12/2002 | Blumrich |
| 2001/0001872 A1 | | 5/2001 | Singh et al. |
| 2002/0073283 A1 | * | 6/2002 | Lewis et al. ............. 711/133 |
| 2003/0065886 A1 | * | 4/2003 | Olarig et al. ............. 711/129 |

FOREIGN PATENT DOCUMENTS

JP    01-092855    12/1989

OTHER PUBLICATIONS

Thiebaut et al., "Improving Disk Cache Hit-Ratios Through Cache Partitioning", IEEE Transactions on Computers, vol. 41, No. 6, Jun. 1992, pp. 665-676.
"Non-Volatile Cache Storage Allocation Algorithm," IBM Technical Disclosure Bulletin, vol. 38, No. 12, Dec. 1995, pp. 39-42.

* cited by examiner

*Primary Examiner*—Mano Padmanabhan
*Assistant Examiner*—Patrick M. Moore
(74) *Attorney, Agent, or Firm*—Mark C. McCabe; Edmund H. Mizumoto

(57) ABSTRACT

A cost-adaptive cache including the ability to dynamically maximize performance in a caching system by preferentially caching data according to the cost of replacing data. The cost adaptive cache includes a partitioned real cache, wherein data is stored in each of the real cache partitions according to its replacement cost. Also, the cost-adaptive cache includes a partitioned phantom cache to provide a directory of information pertaining to blocks of data which do not qualify for inclusion in the real cache. The partitions in the phantom cache correspond to the partitions in the real cache. Moreover, the cost-adaptive cache maximizes performance in a system by preferentially caching data that is more costly to replace. In one embodiment of the system, the cost of replacing a block of data is estimated by the previous cost incurred to fetch that block of data.

18 Claims, 9 Drawing Sheets

SYSTEM AND METHOD FOR PROVIDING A COST-ADAPTIVE CACHE

FIELD OF THE INVENTION

The present invention relates to a caching system and, more specifically, to a method and system of dynamically maximizing performance in a caching system by preferentially caching data that is more costly to replace.

BACKGROUND

The memory hierarchy forms the basic underpinnings of computer systems. As different memory technologies improve in performance at different rates, managing this hierarchy effectively is increasingly the key to achieving good system performance and cost/performance. The techniques for managing the memory hierarchy are generally referred to as caching techniques. Thus far, the emphasis in caching has been on reducing the miss ratio, i.e., the fraction of requests that cannot be satisfied by the cache. But misses vary in their penalty or cost. For example, a request that has to go to a remote site will cost a lot more than one that can be satisfied locally. Also, a request that hits in a downstream cache will cost orders of magnitude less than one requiring a mechanical movement in some storage device. A caching system that makes no distinction between these different requests is dramatically under utilizing the cache space.

There has been some work on cache replacement algorithms that try to include replacement cost in the replacement decision. But such algorithms have a very high processing overhead because they have to maintain some ordering of the blocks based on their replacement cost. An attempt to overcome this problem has been proposed. The proposal provides for the partitioning of the cache so that there is one partition per device, and to adjust the partition sizes to balance the work across the devices. This, however, requires the user or administrator to know the device boundaries and to set up the caching system accordingly. Such information may change and is not easily available when virtualization is used. In addition, it requires many more partitions than necessary, incurring additional overhead and inefficiencies. Moreover, it is focused only on reducing skew across devices and does not handle cost differences that are disclosed by the user/application or that might arise from the type of data (e.g., metadata, log), type of operation (e.g., write, sequential), location of the data etc.

There remains therefore a great need for a caching system that takes into account the different replacement costs of the blocks and yet has low overhead. The present invention satisfies this need by dynamically partitioning the cache based on the replacement cost of blocks.

SUMMARY OF THE INVENTION

The present invention provides a cost-adaptive cache to dynamically maximize performance in a caching system by preferentially caching data according to the cost of replacing data. The cost adaptive cache includes a partitioned real cache, wherein data is stored in each of the real cache partitions according to its replacement cost. Also, the cost-adaptive cache includes a partitioned phantom cache to provide a directory of information pertaining to blocks of data which do not qualify for inclusion in the real cache. The partitions in the phantom cache correspond to the partitions in the real cache. Moreover, the cost-adaptive cache maximizes performance in a system by preferentially caching data that is more costly to replace. In one embodiment of the system, the cost of replacing a block of data is estimated by the previous cost incurred to fetch that block of data.

DETAILED DESCRIPTION

The invention will be described primarily as a system and method for dynamically maximizing performance in a caching system by preferentially caching data that is more costly to replace. The replacement cost of a block of data shall be understood to mean the cost saved by caching that block of data or, in other words, the benefit of caching that block of data. In the following description, for purposes of explanation, numerous specific details are set forth in order to provide a thorough understanding of the present invention. It will be evident, however, to one skilled in the art that the present invention may be practiced without these specific details.

Those skilled in the art will recognize that an apparatus, such as a data processing system, including a CPU, memory, I/O, program storage, a connecting bus and other appropriate components could be programmed or otherwise designed to facilitate the practice of the invention. Such a system would include appropriate program means for executing the operations of the invention.

An article of manufacture, such as a pre-recorded disk or other similar computer program product for use with a data processing system, could include a storage medium and program means recorded thereon for directing the data processing system to facilitate the practice of the method of the invention. Such apparatus and articles of manufacture also fall within the spirit and scope of the invention.

Figure 1:
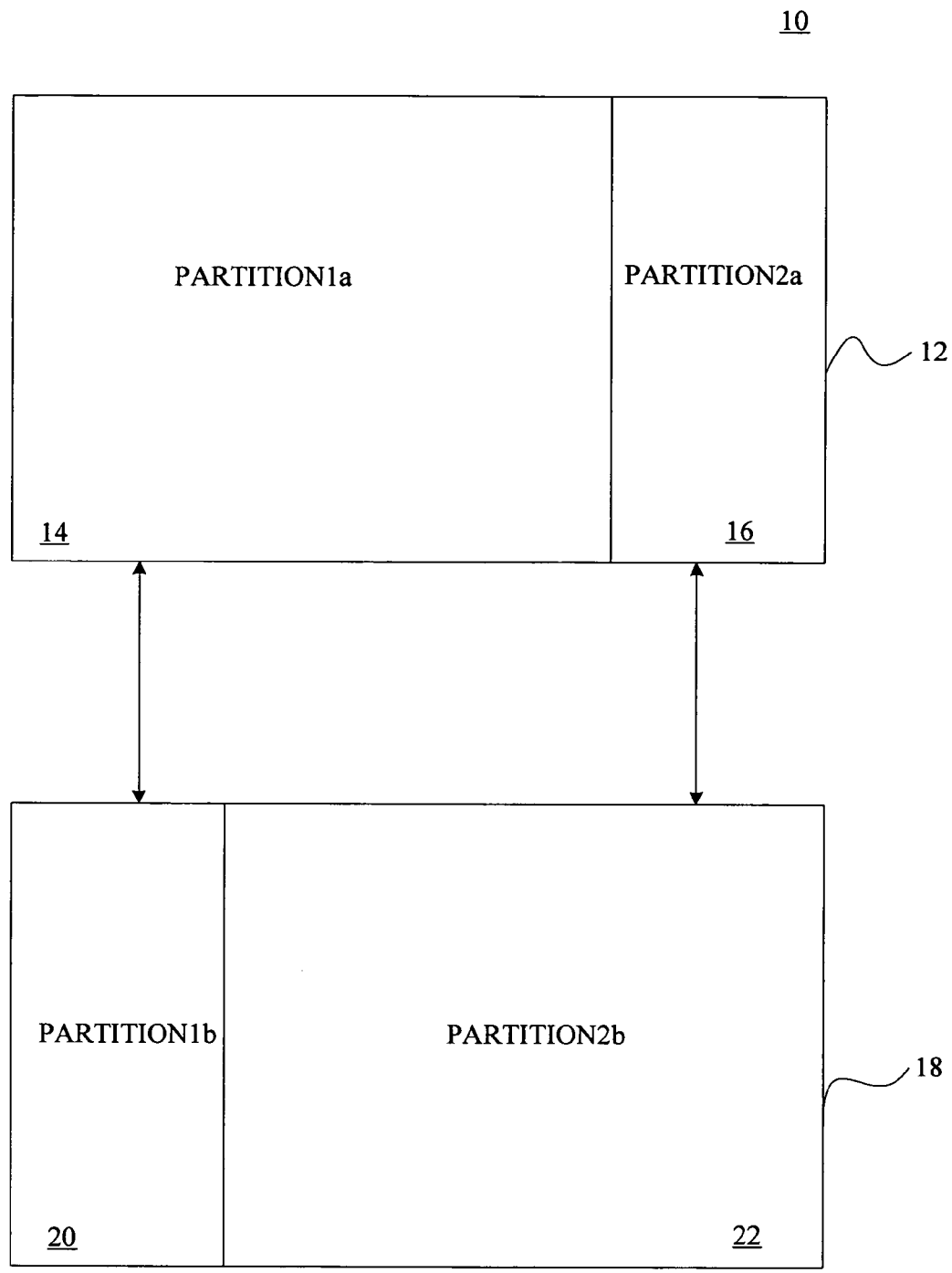
FIG. 1 shows a cost-adaptive cache system, according to an exemplary embodiment of the invention, for preferentially caching data based on a replacement cost of the data.

FIG. 1 shows a cost-adaptive cache system 10, according to an exemplary embodiment of the invention, for preferentially caching data based on a replacement cost of the data. System 10 includes a real cache 12. The real cache 12 is made up of c blocks and can be divided into n partitions (e.g., partition1a 14, partition2a 16, etc.) based on the replacement cost of data stored in each of the c blocks.

In an exemplary example, the real cache 12 would consist of two partitions. The first partition would contain blocks in which the replacement cost is lower than a configurable value (e.g., 1 ms). The second partition would contain all other blocks. More generally, each partition has a pair of replacement costs that define the boundaries for that partition.

System 10 also includes a phantom cache 18. Phantom cache 18 is of size (n−1)*c blocks and is phantom in that it does not contain any data but merely remembers which blocks it contains. Similar to the real cache 12, the phantom cache 18 is also partitioned into n partitions (e.g., partition1b 20, partition2b 22, etc.) such that the total size of the corresponding partitions in the real cache 12 and the phantom cache 18 is less than or equal to c. For instance, if partition1a 14 in the real cache 12 contains d blocks, then partition1a 14 will contain at most c-d blocks. The phantom cache is operated as a victim cache and the blocks evicted from the real cache are entered into the corresponding partitions in the phantom cache. Each partition in the real cache 12 (partition1a 14 and partition2a 16) has a target size, which could be different from the actual size of that partition.

The target sizes of the various partitions of the various partitions can be fixed (static), dynamic (adjusted on every access) or periodically adjusted, although having fixed partitions sizes is unlikely to perform well when the workloads vary. In an exemplary embodiment of the invention, the partitions' target sizes are dynamically adjusted. It should be apparent how the method can be used to set static partition sizes by using fixed replacement cost for each partition. It should also be apparent how the method can be adapted to periodically adjust the target sizes. It involves observing the system and collecting statistics over some interval longer than one access before adjusting the partition sizes.

The mechanism described here applies directly to all stack cache replacement algorithms, including least-recently-used (LRU), least-frequently-used (LFU), etc. More generally, it can be applied to any cache replacement algorithm (e.g., clock). The basic idea is that a hit in the victim cache suggests that if the corresponding partition in the real cache is bigger, we would have eliminated a miss. We should therefore invest more cache space in that partition. Note that the different partitions in the real and victim caches can have different replacement algorithms.

Figure 2:
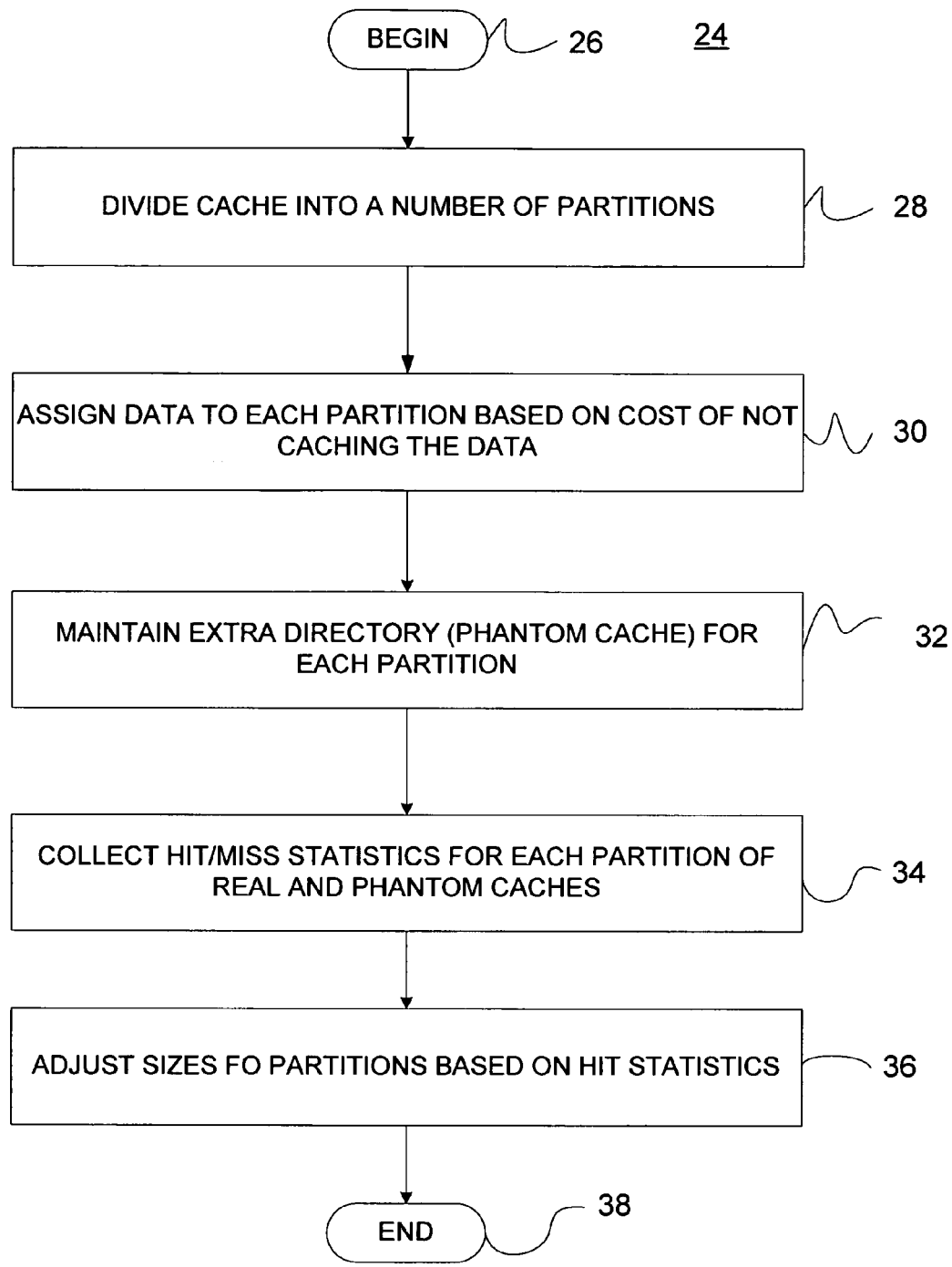
FIG. 2 illustrates a method, according to an exemplary embodiment of the invention, of preferentially caching data based on a replacement cost of the data.

FIG. 2 illustrates a method 24, according to an exemplary embodiment of the invention, of preferentially caching data based on a replacement cost of the data. At block 26, method 24 begins. At block 28, the cache is divided into n partitions. The cache is c blocks and it is divided into n partitions based on the replacement cost of the blocks.

At block 30, data is assigned to each partition based on a replacement cost associated with not caching the data. For purposes of method 24, let us assume that the replacement cost of a given block is known. In an exemplary example, we have a cache which is partitioned into two partitions. The first partition would contain blocks with a replacement cost lower than a configurable value (e.g., 1 ms). The second partition would contain all other blocks. More generally, each partition has a pair of replacement costs that defines the boundaries for that partition. The cache just introduced is known as a real cache, as opposed to a phantom cache which will be introduced below.

At block 32, a directory (e.g., the phantom cache) is created for each partition. As provided above, phantom cache 18 is of size (n−1)*c blocks and is phantom in that it does not contain any data but merely remembers which blocks it contains. The phantom cache is operated as a victim cache and the blocks evicted from the real cache are entered into the corresponding partitions in the phantom cache.

At block 34, hit and miss statistics for each partition of the real and phantom cache are collected.

At block 36, the partition sizes for each of the real cache and the phantom cache are adjusted according to the hit statistics collected at block 34.

At block 38, method 24 ends.

The system of FIG. 1 and the method 24 of FIG. 2 require us to consider three cases. The three cases include a hit to a block in the real cache, a miss in both the real cache and the phantom cache and a hit to a block in the phantom cache.

Hit to a Block in the Real Cache

Figure 3A:
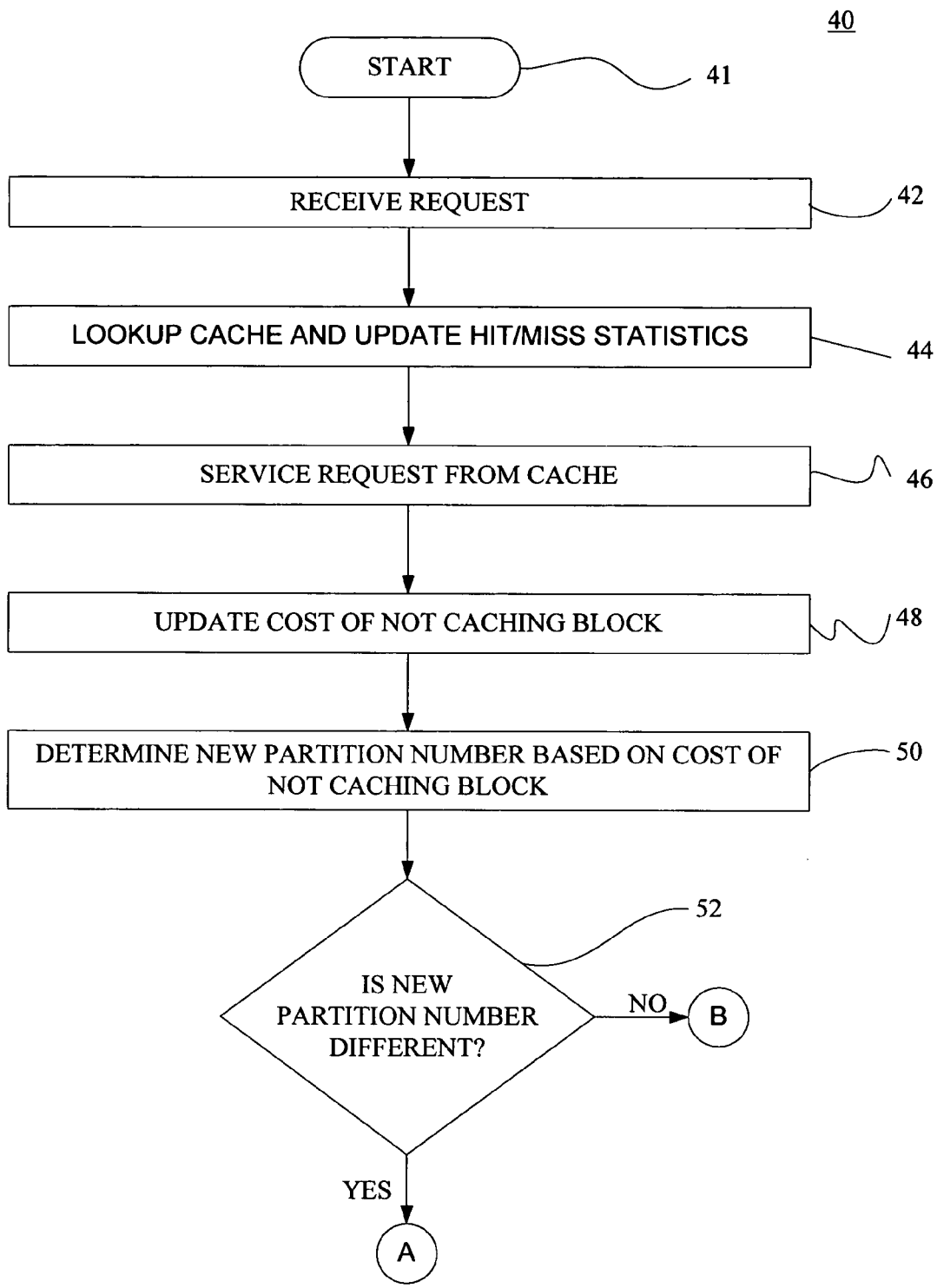
FIG. 3 illustrates a method, according to an exemplary embodiment of the invention, of preferentially caching data based on a replacement cost of the data, where there is a hit in the real cache.
Figure 3B:
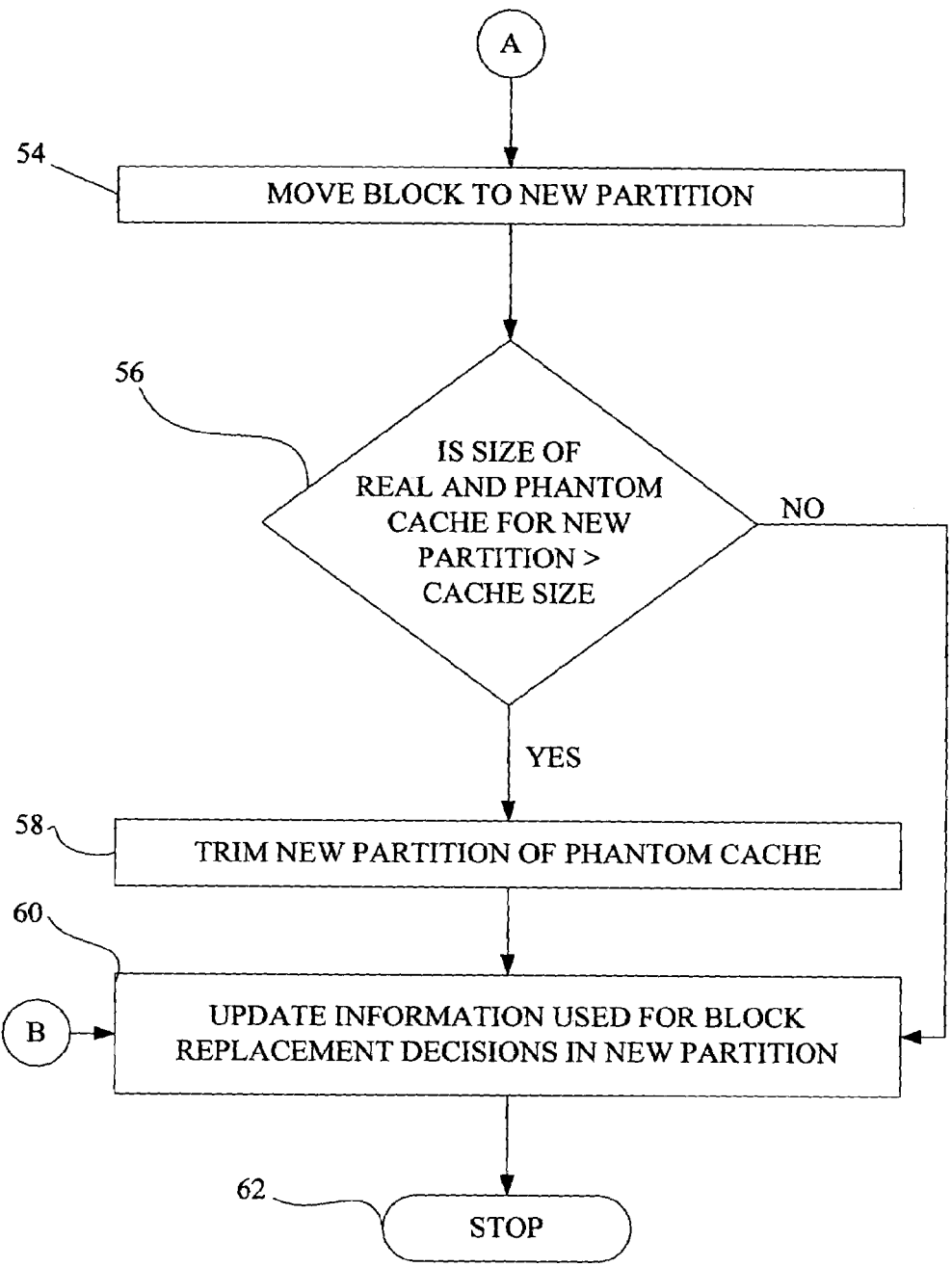

FIG. 3 illustrates a method 40, according to an exemplary embodiment of the invention, of preferentially caching data based on a replacement cost of the data, where there is a hit in the real cache. At block 41, method 40 begins.

At block 42, a data request is received at system 10.

At block 44, a lookup is performed in real cache 12 and hit/miss statistics corresponding to the data requested are updated.

At block 46, the requested data is serviced from real cache 12. That is, the requested data is read from real cache 12.

At block 48, the cost of not caching the requested data is updated.

At block 50, the partition in the real cache 12 in which the requested data should be contained, is identified based on the updated cost of not caching the data. A partition in the phantom cache corresponding to the real cache 12 partition is also identified. For example, if the partition in the real cache 12 is identified as partition1a 14, then the corresponding partition in the phantom cache 18 is partition1b 20.

At block 52, a determination is made as to whether the partition identified at block 50 differs from the original partition in real cache 12, in which the requested data was located. If no, the new partition is not different from the original partition, then at block 60, the information (e.g. block usage frequency, block usage recency) needed to make block replacement decisions in the new partition is updated.

Returning to block 52. If yes, then at block 54, the requested data (e.g., block) is moved to the new partition.

At block 56, a determination is made as to whether the combined total size of the new partition, both as it exists in the real cache 12 and the phantom cache 18 is greater than the total size of the real cache 12. If no, then at block 60, the information needed to make block replacement decisions in the new partition is updated.

Returning to block 56. If yes, then at block 58, the corresponding partition of the phantom cache (e.g., partition1b 20) is trimmed, meaning that blocks are evicted from the corresponding partition of the phantom cache until the total size of the corresponding partitions in the real and phantom caches is not greater than the total size of the real cache.

At block 60, any statistics or bookkeeping that are used to decide which block to replace next are updated. At block 62, method 40 ends.

Miss in Both the Real Cache and the Phantom Cache

Figure 4A:
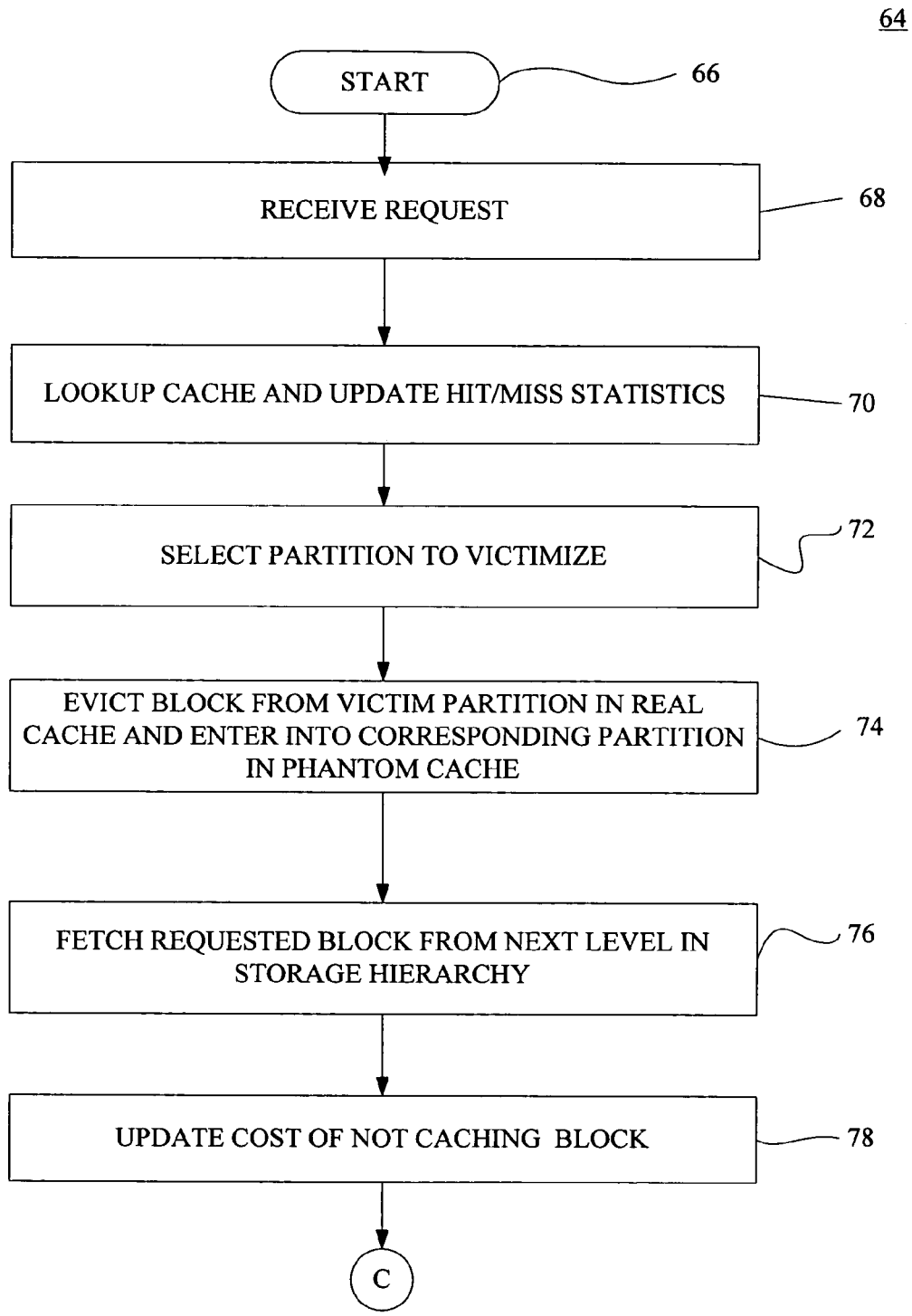
FIG. 4 illustrates a method, according to an exemplary embodiment of the invention, of preferentially caching data based on a replacement cost of the data, where there is a miss in the real cache and a miss in the phantom cache.
Figure 4B:
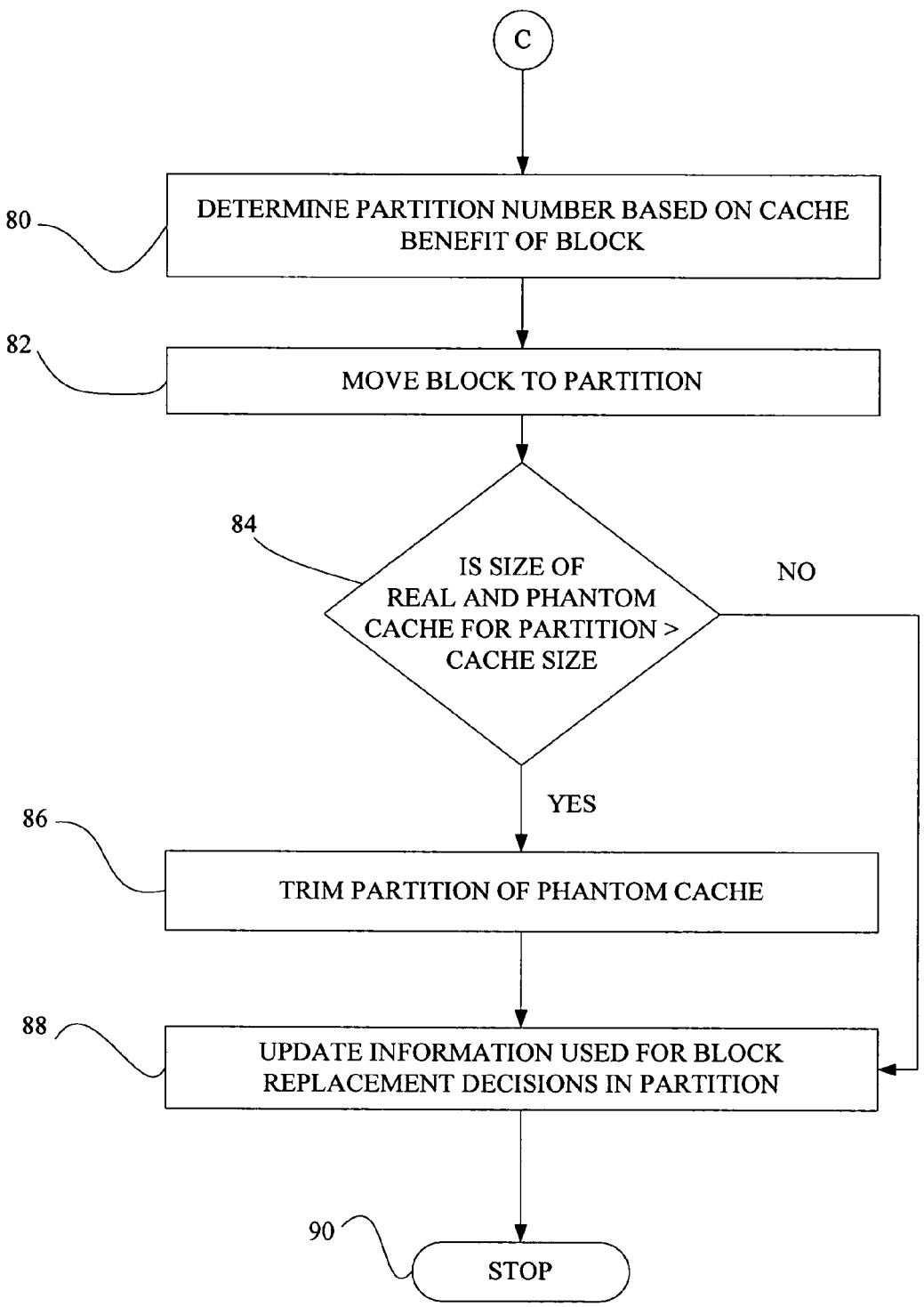

FIG. 4 illustrates a method 64, according to an exemplary embodiment of the invention, of preferentially caching data based on a replacement cost of the data, where there is a miss in the real cache 12 and a miss in the phantom cache 18.

At block 66, method 64 begins.

At block 68, a data request is received at system 10.

At block 70, a lookup is performed in real cache 12 and hit/miss statistics corresponding to the data requested are updated.

At block 72, when there is a miss in both the real cache 12 and the phantom cache 18 a partition (e.g, partition1*a* 14, partition2*a* 16, etc.) is selected to be victimized. In an exemplary embodiment, "to be victimized" means that a block in the real cache 12 must be identified for replacement. This replacement is accomplished by selecting one of the partitions and allowing a replacement algorithm associated with that partition to select a block for replacement. The selected block is entered into the corresponding partition (e.g., partition1*b* 20 and partition2*b* 22) in the victim cache 18 (block 74). For example, in system 10, if a block were selected for replacement in partition2*a* 16 of real cache 12, then the selected block is entered into partition2*b* 22 of phantom cache 18.

In an exemplary embodiment, a partition with some slack (e.g., its actual size is larger than its target size), is preferentially selected. In such a system, two clock hands are maintained that go around all the partitions. The first clock hand will only stop at a partition that has some slack. The second clock hand will stop at any partition. If the replacement cost of the new block is known or if the system has an estimate of the replacement cost of the new block, then a prediction of the final partition of the block can be made. In this case, if that partition has some slack, the first clock hand is initialized to point to that partition. To select a partition from which to obtain a block, the partition pointed to by the first hand is looked at first. If that partition has some slack and some fraction of that slack (e.g., 10%) has not been taken since the first hand has moved there, then that partition is selected. Otherwise, the first hand is advanced to the next partition with some slack and the process is repeated. If none of the partitions have any slack, the second clock hand is used. If more than some fraction (e.g., 5%) of the blocks in the partition pointed to by the second hand have not been taken since the hand was moved there, then that partition is used. Otherwise, the hand is advanced to the next partition and the process is repeated.

At block 76, the requested block is fetched from the next level in the storage hierarchy.

At block 78, the replacement cost associated with the requested data is updated.

At block 80, the partition (e.g., partition1*a* 14) in the real cache 12 in which the requested data will be cached is identified. The requested data is cached as a block of data. The partition is identified according to the replacement cost of the data. For example, an identified partition includes all blocks of data which take more than 1 ms to retrieve if they were not cached.

At block 82, the requested data is cached as a block in the identified partition.

At block 84, a determination as to whether the combined size of the real cache partition (e.g., partition1*a* 14) and its corresponding phantom cache partition (e.g., partition1*b* 20) is greater in size than the real cache 12. If no, then at block 88, any statistics or bookkeeping that are used to decide which block to replace next are updated.

Returning to block 84. If yes, then at block 86, the size of the phantom cache partition (e.g., partition1*b* 20) is trimmed.

At block 90, method 64 ends.

Hit to a Block in the Victim Cache

Figure 5A:
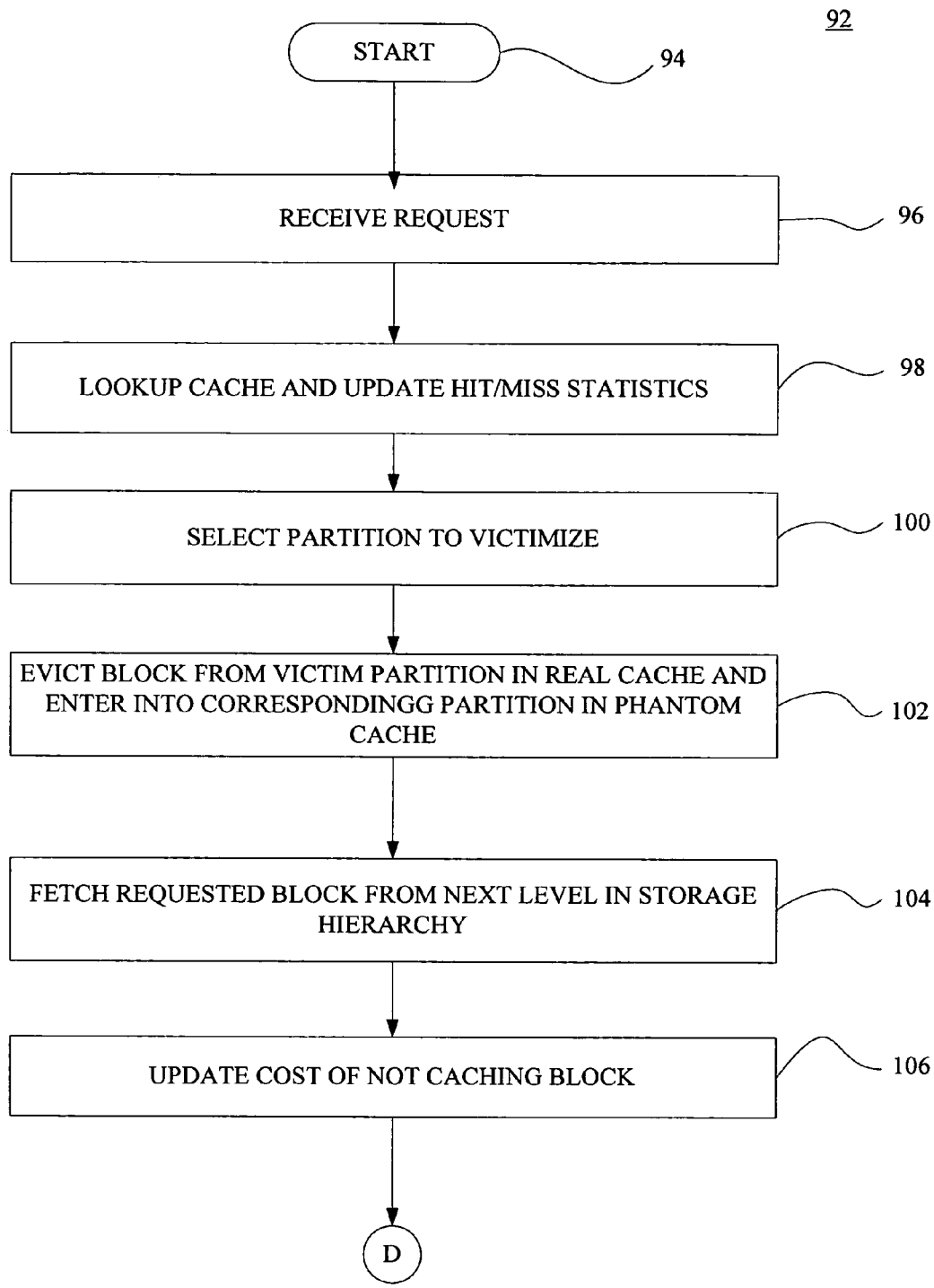
FIG. 5 illustrates a method, according to an exemplary embodiment of the invention, of preferentially caching data based on a replacement cost of the data, where there is a hit in the phantom cache.
Figure 5B:
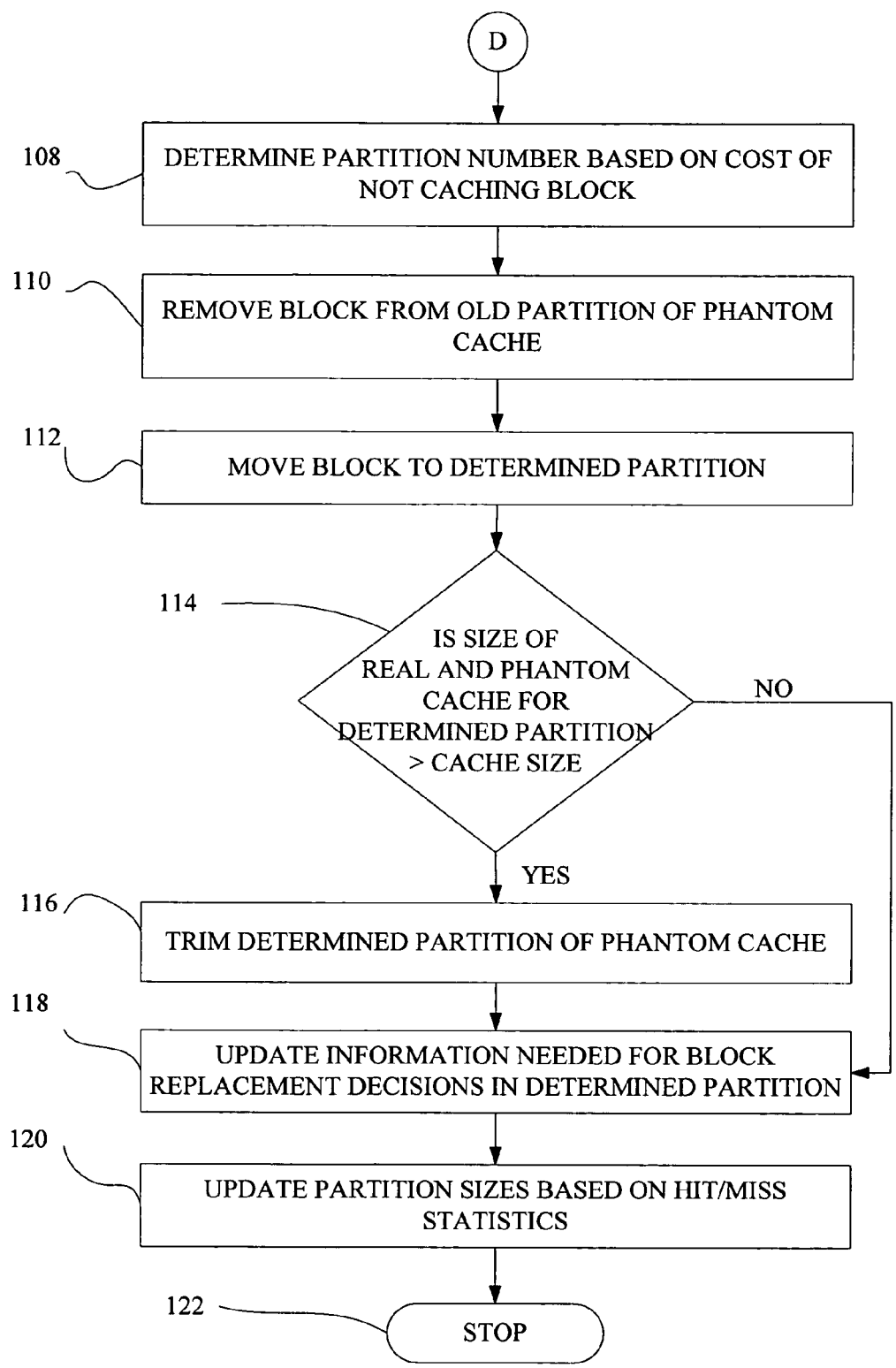

FIG. 5 illustrates a method 92, according to an exemplary embodiment of the invention, of preferentially caching data based on a replacement cost of the data, where there is a hit in the phantom cache 18. When there is a hit in the phantom cache 18 a block is selected for replacement in the real cache 12 and the new block is brought in to the real cache 12. The basic idea is that if there is a hit in a partition of the phantom cache 18, that hit could potentially be turned into a hit in the real cache 12 if more space were allocated to the corresponding partition in the real cache 12. In an exemplary embodiment, the partition sizes can be adjusted while the new lock is being fetched.

At block 94, method 92 begins.

At block 96, a data request is received at system 10.

At block 98, a lookup is performed in real cache 12 and hit/miss statistics corresponding to the data requested are updated.

At block 100, when there is a hit in the phantom cache 18, the partition is identified, and its corresponding partition in the real cache 12 is selected to be victimized. Thus, a block in the real cache's 12 corresponding partition is identified for replacement. This replacement is accomplished by allowing a replacement algorithm associated with that partition to select a block for replacement. The selected block is entered into the corresponding partition (e.g., partition1*b* 20 and partition2*b* 22) in the victim cache 18 (block 102). For example, in system 10, if a block were selected for replacement in partition2*a* 16 of real cache 12, then the selected block is entered into partition2*b* 22 of phantom cache 18. In another embodiment, the victim partition can be selected as in the case of a miss in both the real and phantom caches.

At block 104, the requested block is fetched from the next level in the storage hierarchy.

At block 106, the replacement cost associated with the requested data is updated.

At block 108, the partition (e.g., partition1*a* 14) in the real cache 12 in which the requested data will be cached is identified. The requested data will be cached as a block of data. The partition is identified according to the replacement cost of the data. For example, an identified partition includes all blocks of data which take more than 1 ms to retrieve if they were not cached.

At block 110, the block corresponding to the hit in the phantom cache is removed from the phantom cache 18. That is, the directory entry corresponding to the block is removed from the phantom cache partition (e.g., partition1*b* 20) to which it is associated.

At block 112, the requested data is cached as a block in the identified partition (see block 108).

At block 114, a determination as to whether the combined size of the identified real cache partition (e.g., partition1*a* 14) and its corresponding phantom cache partition (e.g., partition1*b* 20) is greater in size than the real cache 12. If no, then at block 118, any statistics or bookkeeping that are used to decide which block to replace next are updated.

Returning to block 114. If yes, then at block 116, the size of the identified phantom cache partition (e.g., partition1*b* 20) is trimmed. At block 118, replacement information is updated.

At block 120, the sizes of the partitions in the real cache 12 and the phantom cache 18 are updated according to the hit/miss statistics.

At block 122, method 92 ends.

In an exemplary embodiment, with regards to a hit in the phantom cache, the LRU stack distance of the hit in a partition of the phantom cache 18 is estimated. The target size of the corresponding partition in the real cache 12 is increased by an amount determined using control theory (e.g., PD controller) with the stack distance as the error. More precisely, suppose the actual and target sizes of the partition in the real cache are denoted by a and t respectively, and the stack distance is s. t is adjusted towards a+s by using t−a−s as the error. This adjustment using t−a−s as the error is performed a number of times proportional to the average replacement cost of blocks in that partition in the real cache, normalized by the lowest such cost for any partition in the real cache 12. The target sizes in the other partitions in the real cache 12 are reduced accordingly with a round robin method similar to that described above using the second clock hand.

In another exemplary embodiment, the target sizes of the partitions are adjusted based on a simple cost-benefit analysis. Intuitively, if there is a hit in a small partition in the phantom cache 18, and the replacement cost of blocks in that partition is high, there is a likelihood that a large benefit will be received from a small additional investment in that partition of the real cache. Conversely, if there is a hit in a large partition in the phantom cache, and the replacement cost of blocks in that partition is low, the return on further investment in that partition in the real cache is likely to be small. The basic idea is to maximize the return on investment. This is accomplished as follows: Suppose i is the partition that is to be grown, replacement-cost[x] is the average replacement cost of blocks in partition x in the real cache, and phantom-size[x] is the size of partition x in the phantom cache. The size of partition i is adjusted by an amount $\partial$ determined by the ratio of [replacement-cost[i]/victim size[i]]/[replacement-cost[j]/victim-size[j]] for each of the other partitions j, and the size of the other partitions is reduced accordingly. Note that it is preferable to set the target size of the partition to be $\partial$ plus the actual size rather than $\partial$ plus the target size. Otherwise, there is a strong tendency to over-invest in that partition.

In the system described, the actual size of a partition in the real cache may be different from its target size because the system evicts a block from the real cache only when necessary. An alternative to this lazy approach is to adjust the actual size of the partition to its target size immediately. Such an implementation is simpler but does not perform as well. Note that we described the adjustment of partition sizes using the average cost of all the blocks in each partition. This requires maintaining cost information for all the blocks in the real cache. An alternative is to use the mean of the upper and lower cost boundaries for each partition. While we have discussed mostly read caching, it should be apparent that the same ideas applies to other layers in the memory hierarchy (e.g., virtual memory paging) and to other operations such as writes.

Cost Information

The replacement cost of a block can be obtained or estimated based on the type of data (e.g., metadata, log) and/or the type of operation (e.g., prefetch, write, asynchronous writes, sequential I/O). The replacement cost can also be disclosed by the application, user or administrator. For instance, the database can specify that it is more costly to evict blocks containing index pages. It is also possible for the system to infer replacement cost from the location of the data (e.g., remote site, inner track of disk). More generally, such cost information can be obtained by running a simulator that models the relevant components of the system. For example, a disk model can be used to estimate how long it takes to fetch a given block. Some cost information is also available by observing the operation of the system. For example, the access time can be measured from the time when a request is issued to when it is satisfied. Systems could also be modified to feed back other cost information (e.g., service time) about a request. In general, the replacement cost that we use to dynamically partition the cache is a function of one or more of these. In a preferred embodiment, we use the access time observed. Note that instead of using the most recent replacement cost of a block, we can instead use some function (e.g., weighted average, maximum) of its last few costs.

Performance Analysis

Figure 6:
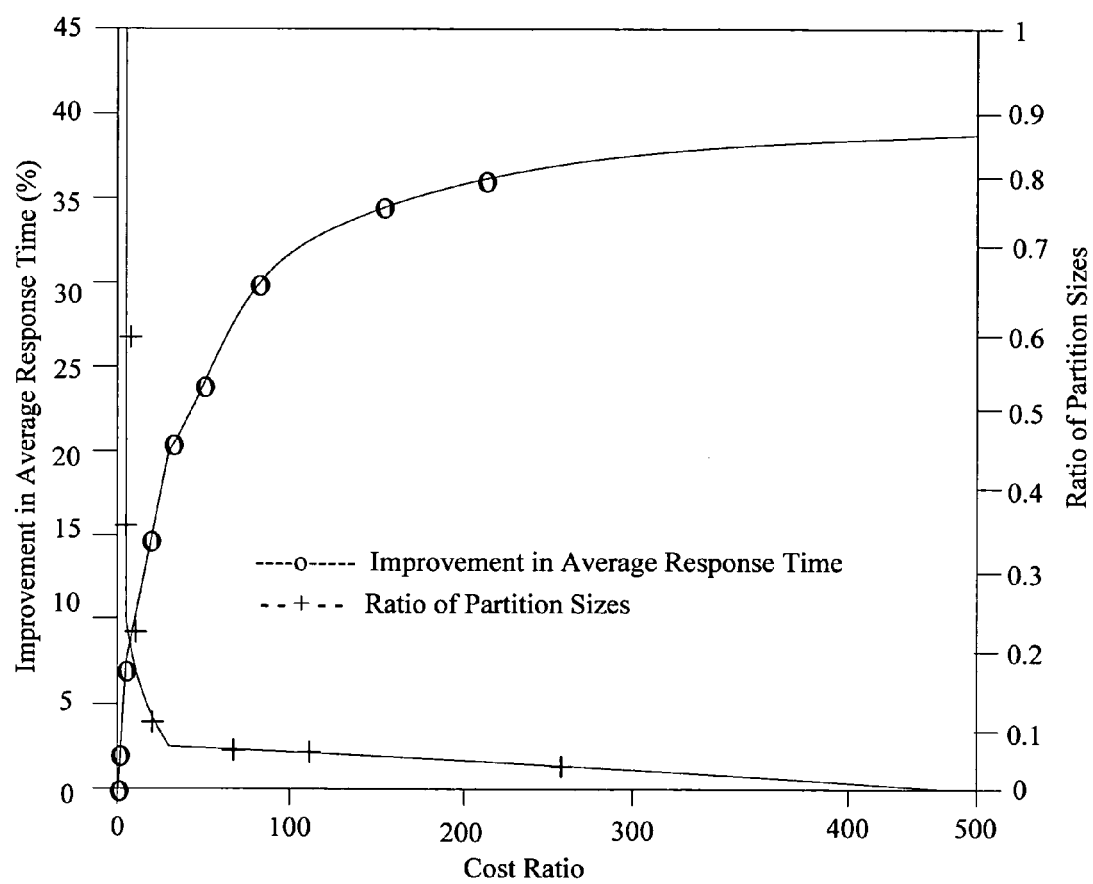
FIG. 6 shows the performance advantage of an exemplary embodiment of the disclosed scheme assuming two partitions, and as a function of the cost ratio between the blocks in the two partitions.

Suppose we have a virtualization layer on top of two storage controllers, the first with lots of cache (e.g., IBM's Enterprise Storage Controller) and the second with little cache (e.g., IBM's FAStT). Half of our data is stored in the first controller, and the other half in the second. The cost of accessing data on the two controllers is drastically different since the first controller is likely to have a lot of hits in its cache. But a traditional caching system will simply assume that it costs the same to access any block of data. Moreover, any system above the virtualization layer has no convenient way of knowing which data is stored where. The cost-adaptive caching system described in this disclosure is able to figure out which blocks are more costly to replace without any intervention by the user or administrator, and it can dynamically optimize the allocation of cache space to maximize returns. For example, let us assume that the miss ratio of a cache goes down as the inverse of the cache size, as can be empirically established using a wide variety of real workloads. FIG. 6 shows the performance advantage of the disclosed scheme assuming two partitions, and as a function of the cost ratio between the blocks in the two partitions. Note that high differentials in the replacement cost of blocks are common, occurring for instance, even with a single storage controller when data that exhibits good locality are already cached in the controller cache. In such situations, the cost-adaptive cache in effect achieves some exclusivity in the contents of the multi-level cache. A high cost ratio is also prevalent when data is distributed geographically or exhibits access skew, as is common in practice.

What is claimed is:

1. A cost-adaptive cache, comprising:
a partitioned real cache, wherein data is stored in each of the real cache partitions according to a replacement cost of the data; and
a partitioned phantom cache to provide a directory of information pertaining to blocks of data which do not qualify for inclusion in the real cache,
whereby the partitions in the phantom cache correspond to the partitions in the real cache,
whereby the cost-adaptive cache maximizes performance in a system by preferentially caching data that is more costly to replace, sizes of the real cache partitions being adjusted based on the replacement cost of the data.

2. The cost-adaptive cache of claim 1 wherein the real cache comprises a variable number of blocks for storing data.

3. The cost-adaptive cache of claim 1 wherein the real cache includes a configurable number of partitions.

4. The cost-adaptive cache of claim 3 wherein the configurable number of partitions are identified according to a replacement cost of data included within each of the partitions.

5. The cost-adaptive cache of claim 3 wherein the partitions each have a pair of associated replacement cost values which define the boundaries for each of the partitions.

6. The cost-adaptive cache of claim 1 wherein the total size of corresponding partitions in the real cache and the phantom cache are less than or equal to the total size of the real cache.

7. The cost-adaptive cache of claim 1 wherein a target size is associated with each of the partitions in the real cache and the target sizes can be fixed, dynamic or adjusted periodically.

8. The cost-adaptive cache of claim 1 further comprises maintaining hit/miss statistics for each of the partitions in the real cache and each of the partitions in the phantom cache.

9. The cost-adaptive cache of claim 1 further comprises moving blocks between partitions within the real cache and the phantom cache in response to hits and misses in the caches.

10. The cost-adaptive cache of claim 9 further comprises adjusting the sizes of the partitions in the real cache to minimize an overall cost of servicing data requests, wherein the overall cost comprises the number of times data is requested and a cost of satisfying each of the requests.

11. The cost-adaptive cache of claim 10 wherein the adjustment is based on hit/miss statistics of the partitions and the relative replacement cost of blocks in the partitions.

12. The cost-adaptive cache of claim 10 wherein the adjustment is based on a stack distance of a hit in the phantom cache.

13. The cost-adaptive cache of claim 9 wherein when a data block is evicted from the real cache, it is moved into the corresponding partition in the phantom cache.

14. The cost-adaptive cache of claim 13 wherein a block of data can be evicted from the phantom cache in order to make room for the data block evicted from the real cache.

15. The cost-adaptive cache of claim 1 wherein the replacement cost of a block of data is obtained by observing the length of time needed to service a request for that data.

16. A method for dynamically partitioning a storage system cache according to a replacement cost associated with data stored in the cache, the cache holding the data as blocks of data, the method comprising the steps of:

maintaining a history of recently evicted data blocks for each partition;

assigning data to one partition based on a cost associated with not keeping the data in the cache;

determining a future size for each partition based on the history and the cost associated with not keeping the data in the cache; and adjusting a real size of each partition based on the determined future size for each partition; and whereby the cache's performance is dynamically maximized by preferentially caching data that are most costly to replace.

17. The method of claim 16 wherein the future size of each partition is determined so as to minimize an overall cost of servicing requests for data, wherein the overall cost comprises the number of times the data is requested and a cost of satisfying each of the requests.

18. The method of claim 16 wherein the cost of not keeping the data in the cache is obtained by observing the length of time needed to service a request for that data.

* * * * *